(12) United States Patent
Chou

(10) Patent No.: US 7,715,127 B2
(45) Date of Patent: May 11, 2010

(54) LENS MODULE AND CAMERA MODULE USING SAME

(75) Inventor: Tai-Hsu Chou, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/341,358

(22) Filed: Dec. 22, 2008

(65) Prior Publication Data
US 2009/0268315 A1    Oct. 29, 2009

(30) Foreign Application Priority Data
Apr. 28, 2008    (CN) .................... 2008 1 0301325.8

(51) Int. Cl.
*G02B 7/02*    (2006.01)

(52) U.S. Cl. ...................................... 359/819; 359/811
(58) Field of Classification Search ................ 359/694, 359/696, 811, 819, 821–824; 348/376; 353/101
See application file for complete search history.

(56) References Cited

U.S. PATENT DOCUMENTS 7,582,995 B2 *    9/2009    Ito et al. ........................ 310/80

* cited by examiner

*Primary Examiner*—Joseph Martinez
(74) *Attorney, Agent, or Firm*—Clifford O. Chi

(57) ABSTRACT

A lens module includes a lens barrel, a ring-shaped magnetic member, and a lens. The magnetic member is received in and attached to the lens barrel. The lens includes a transparent central optical portion and a metallic peripheral portion. The metallic peripheral portion of the lens is magnetically attached to the magnetic member.

13 Claims, 5 Drawing Sheets

LENS MODULE AND CAMERA MODULE USING SAME

BACKGROUND

1. Technical Field

The present invention relates to lens modules and camera modules using the lens modules.

2. Description of Related Art

With the ongoing development of microcircuitry and multimedia technology, camera modules, including, e.g., still camera modules and digital camera modules are now in widespread use and are being combined with various electronic devices. Such camera modules need to satisfy requirements of compactness and excellent optical performance.

Lens modules and image sensors are key components of the camera modules. A typical lens module includes a lens barrel, and at least one lens received in the lens barrel. Generally, a glue is used for positioning the at least one lens in the lens barrel, and a spacer is provided for supporting the at least one lens and spacing the at least one lens from other components received in the lens barrel.

However, adhesive power of the glue may decrease over time, such that the at least one lens is not securely received in the lens barrel.

What is needed, therefore, is a lens module and a camera module using the lens module, which can overcome the above shortcomings.

BRIEF DESCRIPTION OF THE DRAWINGS

Many aspects of present lens module and camera module using the lens module can be better understood with reference to the following drawings. The components in the drawings are not necessarily drawn to scale, the emphasis instead being placed upon clearly illustrating the principles of the present lens module and camera module. Moreover, in the drawings, like reference numerals designate corresponding parts throughout the several views.

DETAILED DESCRIPTION OF THE EMBODIMENTS

Embodiments of the present lens module and camera module using the lens module will now be described in detail below and with reference to the drawings.

Figure 1:
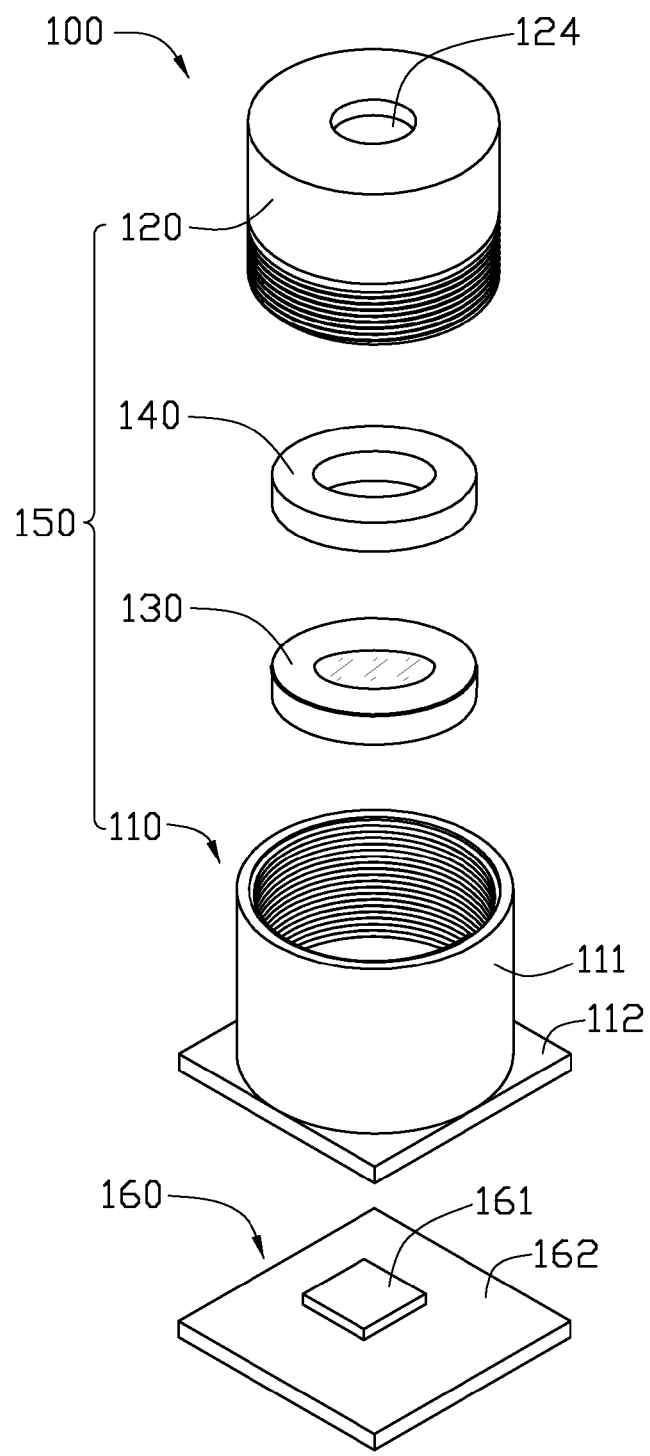
FIG. 1 is a schematic, disassembled view of a camera module in accordance with a first embodiment.
Figure 2:
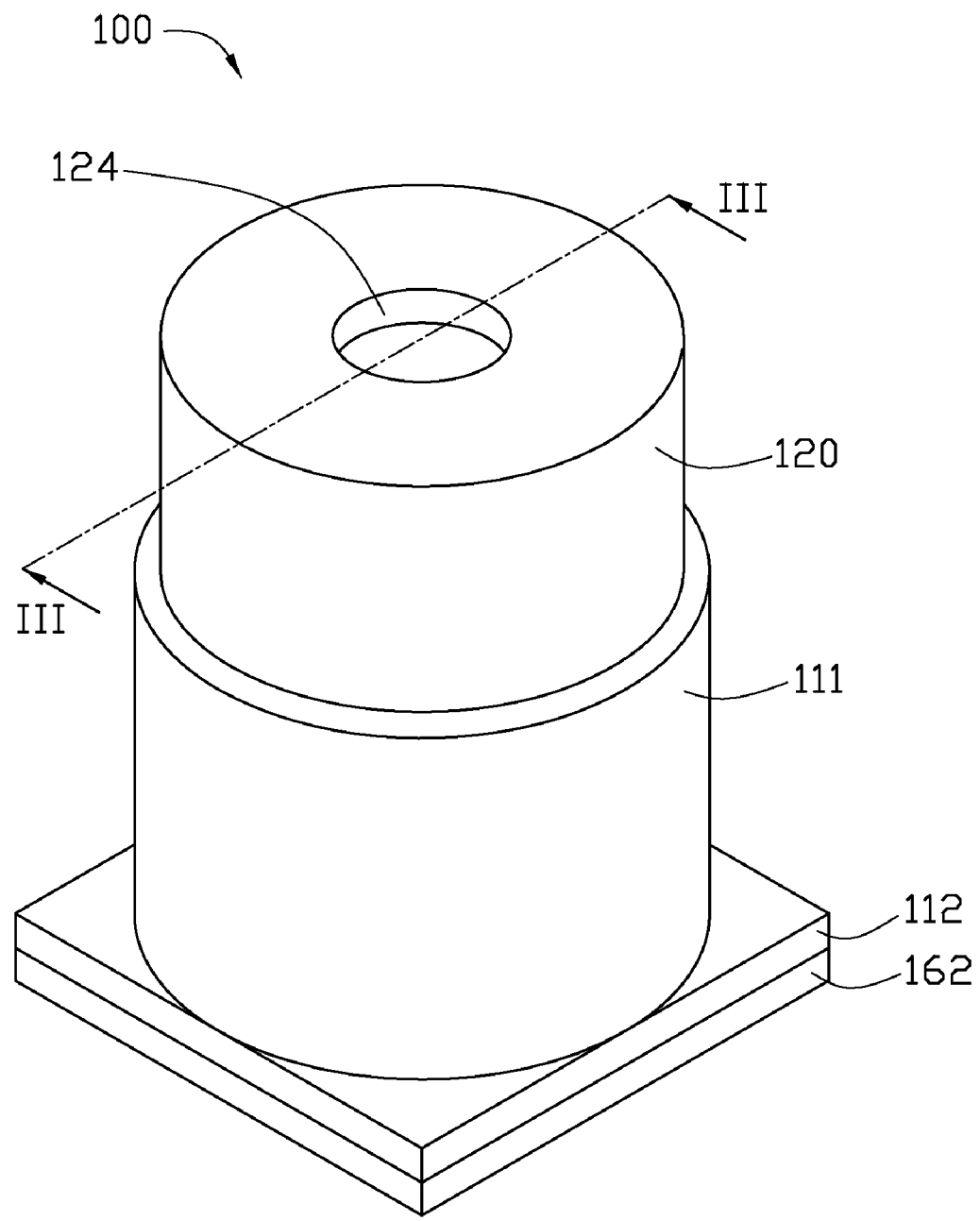
FIG. 2 is an assembled, isometric view of the camera module of FIG. 1.
Figure 3:
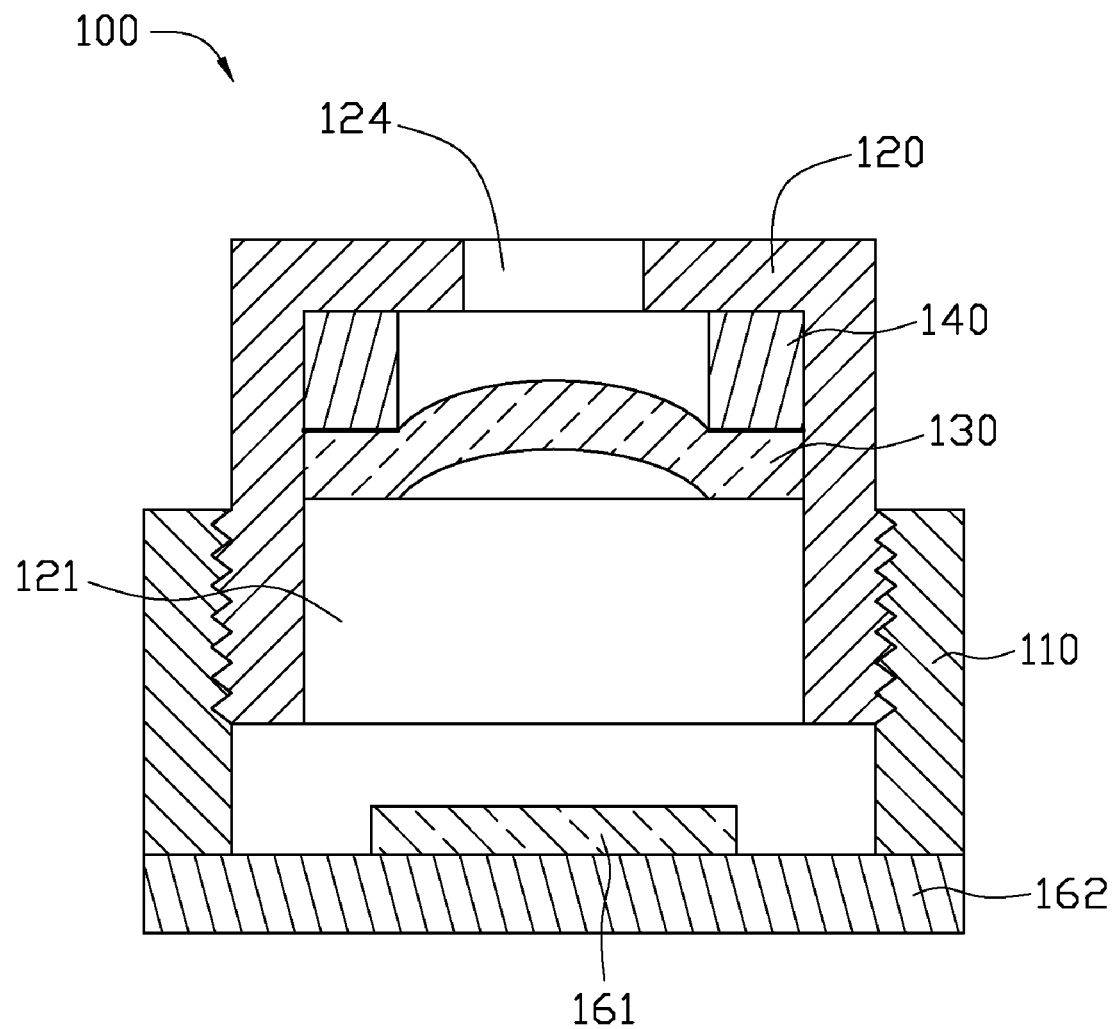
FIG. 3 is a cross-sectional view of the camera module shown in FIG. 2 taken along line III-III, the camera module including a lens.

Referring to FIGS. 1 to 3, an exemplary camera module 100 in accordance with a first embodiment, is provided. The camera module 100 includes a lens module 150 and an image sensor module 160. The lens module 150 includes a lens barrel 120, a ring-shaped magnetic member 140, a lens 130 and a holder 110.

The lens barrel 120 is made from plastic. The lens barrel 120 is cylindrical shaped, and has outer threads formed on an outer wall thereof. The lens barrel 120 has a light incident opening 124 defined at a first end thereof, and has a through hole 121 defined at a second end thereof. The through hole 121 communicates with the light incident opening 124. An inner diameter of the through hole 121 is greater than that of the light incident opening 124.

The magnetic member 140 is received in the through hole 121, adjacent to the light incident opening 124. The magnetic member 140 is a permanent magnet, and is attached to the lens barrel 120 by an insert molding method. An inner diameter of the magnetic member 140 is greater than that of the light incident opening 124, and an outer diameter of the magnetic member 140 is substantially equal to the inner diameter of the through hole 121.

Figure 4:
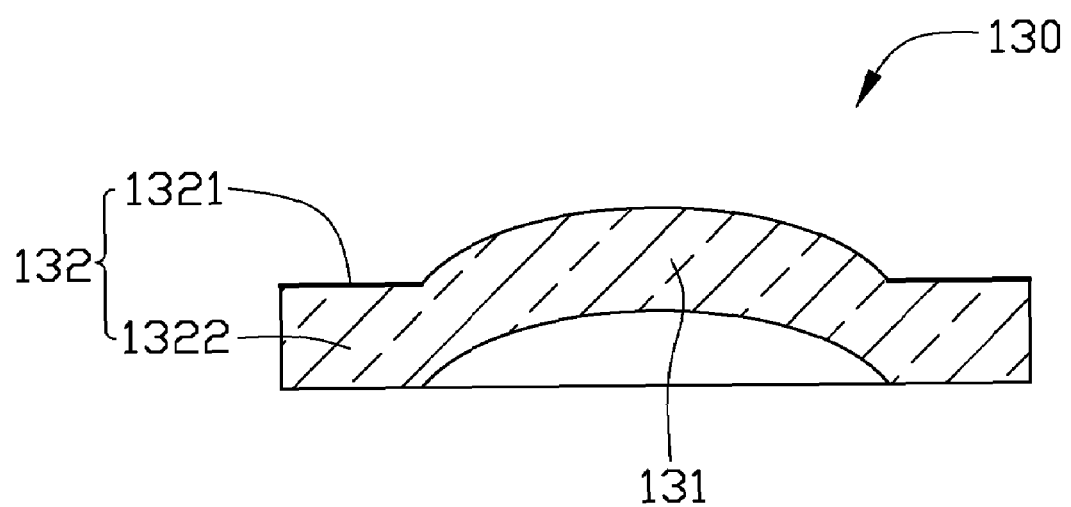
FIG. 4 is a cross-sectional view of the lens of FIG. 3.

Also referring to FIG. 4, the lens 130 includes a transparent central optical portion 131 and a metallic peripheral portion 132. The transparent central optical portion is made from plastic. The metallic peripheral portion 132 includes a plastic main body 1322 integrally formed with the transparent central optical portion 131, and a metal coating 1321 coated on the plastic main body. The metal may be chosen from iron, cobalt, or nickel. Alternatively, the entire metallic peripheral portion 132 may be made of the metal. An outer diameter of the lens 130 is substantially equal to the inner diameter of the through hole 121. The magnetic member 140 is capable of attracting the metallic peripheral portion 132, i.e., the metallic peripheral portion 132 is magnetically attached to the magnetic member 140, thereby positioning the lens 130 in the through hole 121 of the lens barrel 120.

The holder 110 includes a cylindrical portion 111, and a frame 112 integrally formed with the cylindrical portion 111. The cylindrical portion 111 has inner threads formed in an inner wall thereof, thereby facilitating the lens barrel 120 being threadedly engaged therein.

The image sensor module 160 includes a printed circuit board 162 and an image sensor 161 mounted on the printed circuit board 162. The printed circuit board 162 is coupled to the frame 112 of the holder 110, and the image sensor 161 is received in the frame 112.

By the attraction of the magnetic member 140, the lens 130 can be securely received in the lens barrel 120.

Figure 5:
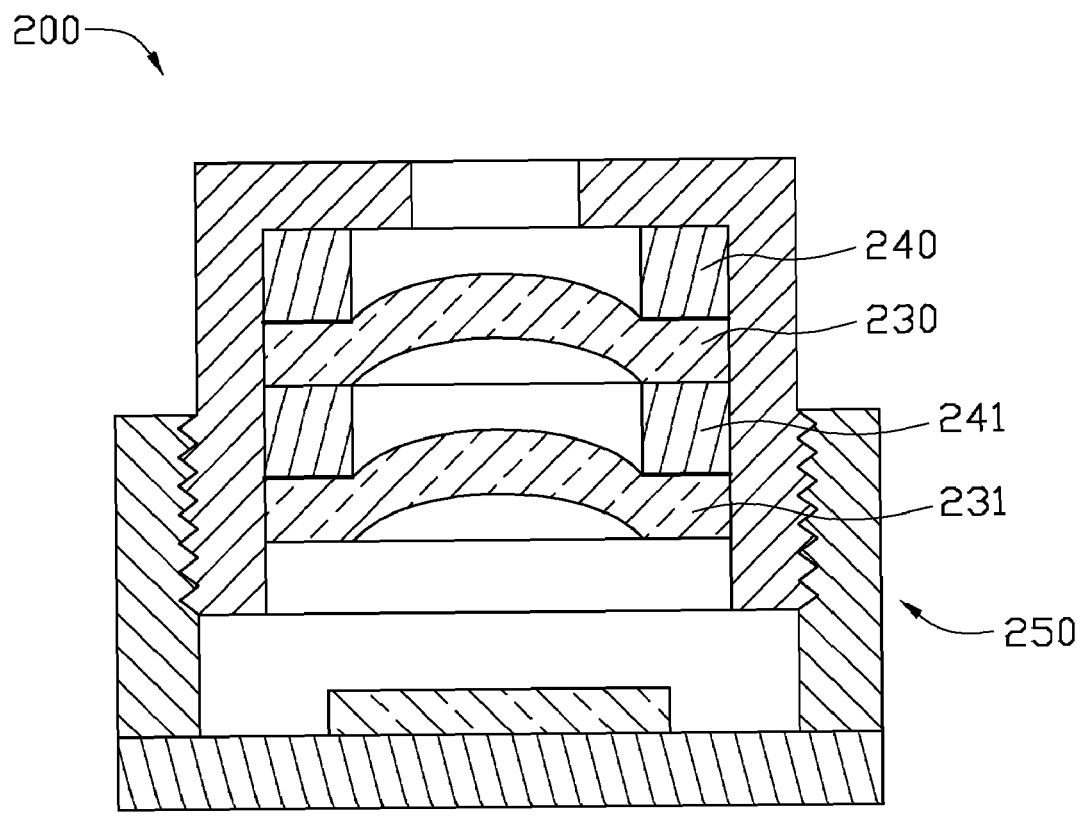
FIG. 5 is a schematic, cross-sectional view of a camera module in accordance with a second embodiment.

Referring to FIG. 5, an exemplary camera module 200 in accordance with a second embodiment, is provided. The camera module 200 is essentially similar to the camera module 100 illustrated above, however, the camera module 200 has a lens module 250 including a first magnetic member 240, a second magnetic member 241, a first lens 230 and a second lens 231. By the attraction of the first and second magnetic members 240, 241, the first and second lenses 130, 131 can be securely received in the lens barrel 120.

The second magnetic member 241 also acts as a spacer for spacing the first and second lenses 230, 231.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:
   a lens barrel;
   a ring-shaped magnetic member received in and attached to the lens barrel; and
   a lens comprising a transparent central optical portion and a metallic peripheral portion, the metallic peripheral portion magnetically attached to the magnetic member.

2. The lens module as described in claim 1, wherein the lens barrel has a light incident opening defined at a first end thereof and a through hole defined at a second end thereof, the through hole communicating the light incident opening, the magnetic member and the lens being received in the through hole.

3. The lens module as described in claim 2, wherein an inner diameter of the magnetic member is greater than that of the light incident opening and less than that of the through hole, an outer diameter of the magnetic member and an outer diameter of the lens are substantially equal to the inner diameter of the through hole.

4. The lens module as described in claim 1, wherein the lens barrel is made from plastic, the magnetic member is attached to the lens barrel by insert molding.

5. The lens module as described in claim 1, wherein the metallic peripheral portion includes an annular plastic main body and a metal coating coated on the plastic main body.

6. The lens module as described in claim 5, wherein the metal is chosen from the group consisting of iron, cobalt and nickel.

7. A camera module, comprising:
a lens barrel;
a ring-shaped magnetic member received in and attached to the lens barrel;
a lens comprising a transparent central optical portion and a metallic peripheral portion, the metallic peripheral portion magnetically attached to the magnetic member; and
an image sensor aligned with the lens.

8. The camera module as described in claim 7, wherein the lens barrel has a light incident opening defined at a first end thereof and a through hole defined at a second end thereof, the through hole communicating the light incident opening, the magnetic member and the lens being received in the through hole.

9. The camera module as described in claim 8, wherein an inner diameter of the magnetic member is greater than that of the light incident opening and less than that of the through hole, an outer diameter of the magnetic member and an outer diameter of the lens are substantially equal to the inner diameter of the through hole.

10. The camera module as described in claim 7, wherein the lens barrel is made from plastic, the magnetic member is attached to the lens barrel by insert molding.

11. The camera module as described in claim 7, wherein the metallic peripheral portion includes an annular plastic main body and a metal coating coated on the plastic main body.

12. The camera module as described in claim 11, wherein the metal is chosen from the group consisting of iron, cobalt and nickel.

13. A lens module, comprising:
a lens barrel;
a first ring-shaped magnetic member and a second ring-shaped magnetic member received in and attached to the lens barrel;
a first lens comprising a first transparent central optical portion and a first metallic peripheral portion, the first metallic peripheral portion magnetically attached to the first magnetic member; and
a second lens comprising a second transparent central optical portion and a second metallic peripheral portion, the second magnetic member arranged between the first and second lenses, the second metallic peripheral portion of the second lens magnetically attached to the second magnetic member.

\* \* \* \* \*